3,041,195
WRINKLE-FINISH COMPOSITIONS AND METHOD OF PRODUCING SAME
Harold E. Saewert, Park Forest, and Frank E. Kuester, La Grange Park, Ill., assignors to Swift & Company, Chicago, Ill., a corporation of Illinois
No Drawing. Filed July 16, 1959, Ser. No. 827,423
18 Claims. (Cl. 117—41)

This invention relates to a method for preparing wrinkle finishes and more particularly to the manufacture of films or other forms of curable polyepoxides, at least one surface of said films or other forms having a wrinkle finish thereon.

While wrinkle product finishes have been known for many years and a great variety of wrinkle-finish compositions have been suggested for various uses, many of these compositions fail to provide all of the characteristics desired in a wrinkle-type finish. It is desired that a wrinkle-finish coating composition be simple to apply to objects on which it may be applied, it should provide a tough, heat-resistant, abrasion-resistant, flexible film or coating which is not adversely affected to any significant degree by solvents, and it should be possible to color the film so as to provide an attractive finish. Furthermore, the method of preparing the film and applying it to irregular conformations should be as simple as possible and not require specialized equipment.

It is therefore an object of this invention to provide thermoplastic and thermoset films having a wrinkle finish, said films having an improved strength and flexibility as well as resistance to melting at high temperatures.

A further object is to provide a method for manufacturing wrinkle-coated objects in which the coating exhibits all of the desirable features mentioned previously.

Still a further object is to provide coated objects with a decorative wrinkle finish having mechanical properties not usually found in coatings of this type.

Additional objects, if not specifically set forth herein, will be readily apparent to those skilled in the art from the detailed description of the invention which follows.

Broadly, this invention comprises a method for forming a wrinkle finish on the surface of a film by first forming a continuous film of a curable polyepoxide composition and treating the surface of said film to effect wrinkling of said surface. Also contemplated is the treatment of the surface of polyepoxides wherein the polyepoxide composition is in a form other than a film such as a block or other geometrical form with a curing agent to impart to the surface thereof a wrinkle-textured finish. Although the invention has application in the treatment of the polyepoxide per se, a particularly desirable embodiment involves the treatment of the curable polyepoxide in combination with another composition such as a polymer.

One embodiment of the invention comprises a method for coating objects with a continuous film of a polymeric composition and treating the polymeric composition to effect wrinkling of the coated surface. The coating composition may be composed of a modified vinyl resin which can be deposited as a thin continuous film on the object being coated and the thin film then treated to cause the surface of the film to pucker or shring into furrows or ridges. The flexible decorative coating can be applied to such objects as metal furniture, certain interiors of automobiles and airplanes, and in other applications where protection against abrasion, coupled with decorative effects, is desired.

The process comprises forming a continuous film of a vinyl resin-polyepoxide mixture and treating the surface of the film with an epoxy curing agent followed by heating where required to effect cure of the surface of the film.

The curing treatment often takes place at elevated temperatures and causes the surface of the film to pucker and develop furrows and ridges typical of the well-known wrinkle-type finish. The hardness of the film can be adjusted by varying the degree of cure, lowering the amount of polyepoxide, and using fillers or other means well known in the art. Heating at an elevated temperature for a moderate time or heating at a moderate temperature for a long period of time results in substantial curing of the film. Although the film adheres to the object being coated because of the uninterrupted nature of the coating, it is possible where the object is not completely coated to insure adhesion of the film to the surface being coated by first treating the surface with a primer. In some cases, depending upon the coating employed, the coating itself will adhere to the supporting surface.

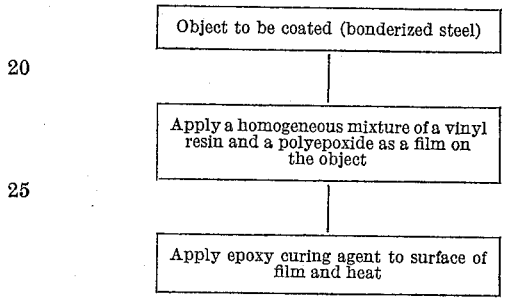

Production of the wrinkle finish on the surface of the resin coating requires that the wrinkling or curing agent not be distributed throughout the mass of the resin, since a surface action is involved. The curing mechanism should be initiated before the curing agent migrates into and becomes distributed throughout the depth of the coating. Typical epoxy curing agents such as the polybasic acids which form polyesters with the epoxides can be employed for this purpose. It has been found that those acidic curing agents having a primary dissociation constant (pKa) less than 4.0 are suitable in the process. Examples of such materials are the polybasic aromatic acids such as phthalic, isophthalic, terephthalic, and naphthalic acids among the dibasic acids; hemimellitic, trimellitic, and trimesic acids among the tribasic acids; and mellophanic, prehnitic, mellitic, benzene pentacarboxylic, and pyromellitic acids as tetra and pentabasic benzenoid acids. While oxalic, malonic, maleic, fumaric, tartaric, citric, itaconic, and malic acids are typical aliphatic acids which are effective in the process, some of the other aliphatic polycarboxylic acids do not have a sufficiently high primary dissociation constant (pKa) to effect curing of the epoxy group and thus develop the wrinkled finish. Polybasic acid anhydrides which are suitable in the process are those which upon hydrolysis in a polar solvent such as in alcohol solution contain at least two acid groups. Pyromellitic dianhydride and trimellitic anhydride are typical suitable acid anhydride curing agents.

While several inorganic polybasic acids such as sulphuric acid, etc., have a dissociation constant sufficiently low to fall within the definition noted above, these acids are dehydrating agents and, without some means for moderating their activity, char the surface of the coating composition and thus cannot be employed. Boric acid, on the other hand, is very well adapted for use in the process, even though the (pKa) of this acid is outside the desired range. Moreover, boric acid, unlike the other inorganic acids mentioned previously, is not a strong dehydrating agent.

Another group of suitable epoxy curing agents which can be employed in producing the wrinkle finish include the strong Lewis acids which form polyethers from the epoxide group. Strong Lewis acids other than protonic acids and which include Friedel-Crafts catalysts such as the anhydrous inorganic halides, aluminum trichloride, ferric chloride, tin tetrachloride, boron trifluoride, zinc chloride, and silicon tetrachloride are very satisfactory in the curing of the polyepoxide to form polyethers. Other suitable strong Lewis acids include arsenic trichloride, bismuth trichloride, antimony trichloride, and complexes of these materials such as boron trifluoride-etherate.

Accordingly, depending upon the type of curing agent employed and the presence or absence of a curing agent in homogeneous mixture in the curable composition, the wrinkle-finish film may be a layer of a polyether or a polyester overlying a polyether, a polyester, or a plasticized thermoplastic material. Treatment of a polyvinyl chloride-epoxidized oil plastisol with a polyether forming curing agent, followed by heating to the fusion temperature of the vinyl, results in a polyether wrinkle overlying the fused vinyl-epoxidized oil layer. Treatment of a film of the same plastisol with a polyester forming curing agent, on the other hand, results in a polyester wrinkle overlying the fused vinyl-epoxidized oil wrinkle. Incorporation of a small amount of a curing agent in the plastisol permits cure of the lower layer of the film but should, of course, cure at a slower rate than the cure being developed on the surface. The following combinations are possible in the wrinkle finish:

| Continuous film supporting the wrinkle: | Wrinkle finish |
|---|---|
| Plasticized resin | Polyether |
| Do | Polyester |
| Polyether-resin | Polyether |
| Do | Polyester |
| Polyester-resin | Polyether |
| Do | Polyester |

The wrinkle finish and the film underlying the wrinkle form a unitary mass, the wrinkle containing residual amounts of the curing agent.

The oxirane composition which is treated in accordance with the method of this invention should contain sufficient oxirane oxygen to permit some cross-linking. Generally, the oxirane-containing material is combined with another thermoplastic or thermosetting material to take advantage of the mechanical properties of such materials although it is possible to use the oxirane-containing compositions alone. The vinyl resins are particularly preferred as the thermoplastic resin portion of the film-forming material although other thermoplastic resins with which the oxirane-containing composition are compatible may also be employed. Vinyl polymers with which the epoxy composition may be combined to form the coating include those polymers in which at least 50% of the monomer units are vinyl halide units. This includes primarily vinyl halide polymers such as polyvinyl chloride, polyvinyl bromide, polyvinyl fluoride, and vinyl chloride-vinylidene chloride copolymers and vinyl chloridevinyl acetate copolymers as well as interpolymers and homopolymers of vinyl halides. Other vinyl-containing monomers which may be copolymerized with the vinyl halide include vinyl ketones such as vinylbutyl ketone, the acrylates and lower alkyl esters of maleic and fumaric acid. The vinylite resins such as Vinylite VAGH, Vinylite VYHH, Vinylite VMCH and the Geon resins such as Geon 103 and Geon 121 are specific examples of commercially available vinyl halide polymers. Vinylite VAGH is reported to contain 91% vinyl chloride units, 3% vinyl acetate units, and 6% vinyl alcohol. Vinylite VYHH contains 87% vinyl chloride and 13% vinyl acetate. Vinylite VMCH contains about 86% vinyl chloride, 13% vinyl acetate, and 1% maleic acid. Geon 121 and Geon 103 contain in excess of 90% vinyl chloride units and generally 96–100% vinyl chloride units.

The oxirane-containing component of the coating composition is characterized as a long-chain polyepoxy acid, alcohol, ester, amide, or other derivative containing sufficient oxirane oxygen to permit cross-linking. The epoxidized fatty compositions, including epoxidized animal, vegetable, and marine triglycerides and derivatives of the expoxidized fatty acids derived therefrom, are particularly desirable. These compositions contain fatty acyl radicals of 10–30 carbons containing two or more oxirane groups and are usually free of terminal oxirane groups. Epoxy fatty acid esters of polyhydric alcohols of 2–6 carbon atoms, such as the glycol and glycerin esters of epoxy-containing aliphatic carboxylic acids having 10–30 carbons, are illustrative of the oxirane-containing composition. In general, those epoxy fatty acyl derivatives containing an average of more than one oxirane group per molecule may be employed if very active curing agents are used. Naturally occurring triglycerides which may be employed in preparing the epoxy component of this composition are those triglycerides having sufficient unsaturation in the fatty acid chains to provide upon epoxidation an average of more than one epoxy group per molecule. The drying and semidrying oils such as soybean oil, linseed oil, perilla oil, rape seed oil, and fish oils are illustrative of this group. Other materials which can be employed include epoxidized lard oil, epoxidized cottonseed oil, and the monohydric alcohol esters of epoxy fatty acids such as methyl 9, 10, 12, 13-diepoxystearate and mixtures thereof. The high oxirane content polyepoxides having an oxirane content in excess of about 8.5% such as are described in copending application Serial No. 807,985, filed April 22, 1959, and copending application Serial No. 795,607, filed February 26, 1959, are particularly desirable as the polyepoxy components since the use of these compositions insures that the coating composition will adhere tenaciously to the supporting structure when cured. Also, it is not necessary to cure the base because of high compatibility of these high oxirane fats with the resin.

The nonfatty epoxy compositions having terminal epoxy groups such as the liquid low molecular weight glycidyl polyethers of dihydric phenols may also be employed in providing the wrinkle finish. Those polyethers obtained by reacting epichlorohydrin with a dihydric phenol in an alkaline medium are particularly satisfactory. Reaction products of polyhydric phenols with halogen containing epoxides in an alkaline medium are generally satisfactory polyepoxy compositions. Alicyclic diepoxides, including dicyclopentadiene diepoxide, limonene diepoxide, and (3,4 epoxy-6-methylcyclohexylmethyl-3,4-epoxy-6-methylcyclohexane carboxylate) may also be employed as the polyepoxide. Nevertheless, since these compositions are comparatively less reactive, the curing agent necessary to wrinkle such compositions must be a strong Lewis acid or a polycarboxylic acid containing three or more carboxyl groups.

The two primary components of the coating composition, namely, the thermoplastic resin and the polyepoxide, are combined in the approximate ratio of more than about 10 parts epoxide to 100 parts resin. The amount of epoxide material employed will depend upon the compatibility and functionality of the epoxy composition with the resin, activity of the curing agent, and the mechanical properties desired in the final coating. It should be recognized that the high oxirane fatty compositions, i.e., those containing above about 8.5% oxirane oxygen, are very compatible with the thermoplastic material and can be used in larger amounts without bleeding to provide a more flexible coating which can be cured to a harder state. This, of course, is a result of the higher degree of cross-linking which is obtainable with such compositions.

In preparing the coating it is recommended that the resin and polyepoxide be intimately mixed to form a homogeneous combination before the coating is applied to the surface. Depending upon the requirements of the given application such as thickness of the coating, tensile strength, flexibility, etc., the coating can be applied as a plastisol, an organosol, a latex, or from solution. It is also possible to spread a dry blend of the mix on the supporting surface and fuse the dry blend. When the coating is applied to the supporting object, the wrinkling agent is spread on the surface of the coating and the coated surface is then subjected to cure conditions.

The curing agent may be applied as a spray from solution in a solvent or as a dispersion in a liquid carrier or it may be distributed on the surface of the coating in dry particulate form. In the case of curing agents available in gaseous form, it is possible to apply these materials as a gas. After distribution of the curing agent on the surface of the resin mix, the coating carrying the curing agent is exposed to curing conditions before the curing agent becomes distributed throughout the depth of the resin layer. In those cases where the continuous film of the resin mix is fused prior to treatment with the curing agent, the likelihood of the curing agent penetrating through the film to the supporting surface is minimized.

The coating may be applied by any of the well-known prior art techniques such as by dipping, brushing, knife coating, roller coating, or spraying. It may also be applied by immersing a preheated article to be coated in a fluidized bed of the coating composition in the form of discrete particles. It is also possible to employ a preformed film of the coating composition, placing the preformed film on the object to be coated, followed by treatment with the curing agent and cure. In another modification, a film of the resin mix containing a blowing agent may be formed, the film then foamed, and the wrinkle developed on the surface of the foamed plastic.

The curing agent is preferably applied from solution or by way of a liquid carrier. Any of the conventional solvents in which the curing agent is soluble or in which it can be finely dispersed may be employed as a spray to distribute the curing agent on the surface of the coating. The solvent employed should be relatively volatile and should although not necessarily be easily removable without elevating the temperature to an excessive degree thus forming pits in the surface as a result of evaporation of the solvent at high temperature. The lower alkyl alcohols and ketones, such as methanol, ethanol, propanol, and acetone, may desirably be employed as the solvent for the curing agent. Also the lower boiling chlorinated hydrocarbons are suitable for this purpose. Where very active catalysts such as the strong Lewis acids are employed, it is possible to employ higher boiling solvents such as aromatic hydrocarbons including benzene, toluene, xylene, etc. The solvent selected should be one which complexes with the Lewis acid and does not react. On the other hand, where the anhydrides are used as the curing agent the solvent should be one which permits hydrolysis of the anhydride to produce two or more acid groups.

In one embodiment of the invention, a plastisol of a dispersion type polyvinyl chloride resin such as Geon 121 (containing 96+% polyvinyl chloride) is dispersed with about 100 parts of epoxidized linseed oil (oxirane content 9.2) for each 100 parts of the resin. The plastisol is spread on a smooth metal surface such as bonderized steel in a film thickness of approximately 1–40 mils and the coated metal panel is heated to a temperature of about 165° C. to fuse the vinyl resin. The fused coating is then sprayed with a solution of 9% pyromellitic dianhydride in ethanol, and the panel is baked in an oven for about 5 minutes at 210° C. A hard decorative wrinkle-type finish is thereby produced. A more complete fusion of the plastisol prior to spraying with the anhydride curing agent results in a finer texture in the wrinkle finish. Complete cure of the plastisol should be avoided, however, since no change in the surface of the coating will be effected by treatment with the curing agent if the coating is first cured completely.

The following examples illustrate variations in the technique for applying the coating composition as well as variations in the degree of cure required for various curing agents.

EXAMPLE I

Plastisols containing 100 parts per hundred of resin of epoxidized linseed oil having an oxirane content of 9.25%, an iodine value of 5.87, a saponification number of 173.8, and a free fatty acid content expressed as percent oleic acid of .07, were formulated as follows:

Plastisol A:
    100 parts polyvinyl chloride resin, dispersion type (Geon 121)
    100 parts epoxidized linseed oil
    5 parts red pigment Plastisol B:
    100 parts polyvinyl chloride resin, dispersion type (Geon 121)
    100 parts epoxidized linseed oil
    5 parts yellow pigment Plastisol C:
    100 parts polyvinyl chloride resin, dispersion type (Geon 121)
    100 parts epoxidized linseed oil Plastisol D:
    100 parts polyvinyl chloride resin, dispersion type (Geon 121)
    100 parts epoxidized linseed oil
    3 parts carbon black Plastisol E:
    100 parts polyvinyl chloride resin, dispersion type (Geon 121)
    100 parts epoxidized linseed oil
    3 parts iron oxide pigment Each of the foregoing plastisols was cast as a 10 mil film on a steel panel. The plastisols were then sprayed with various solutions of polybasic acids and polybasic acid anhydrides, followed by baking at 210° C. for 5 minutes in order to achieve a wrinkle finish. The results are set out in the table which follows:

Table I

| Plastisol | Curing agent | Solvent | Finish obtained |
|---|---|---|---|
| A | Maleic anhydride | 90% ethyl alcohol, 10% methyl alcohol. | No wrinkle. |
| A | Isophthalic acid | Tetrahydro furan | Wrinkle. |
| A | Tetrahydro phthalic anhydride. | 90% ethyl alcohol, 10% methyl alcohol. | No wrinkle. |
| B | Pyromellitic acid | do | Wrinkle. |
| B | Maleic acid | do | Do. |
| B | Oxalic acid | do | Do. |
| B | Succinic acid | do | No wrinkle. |
| B | Dithio propionic acid | do | Do. |
| B | Azelaic acid | do | Do. |
| B | Adipic acid | do | Do. |
| B | Boric acid | Methanol | Wrinkle. |
| C | Citric acid | 90% ethyl alcohol, 10% methyl alcohol. | Do. |
| D | Aconitic acid | do | Do. |
| D | Itaconic acid | do | Do. |
| D | Trimellitic anhydride | do | Do. |
| D | do | Tetrahydro furan | No wrinkle. |
| E | Oxalic acid | Water | Wrinkle. |
| E | Boric acid | do | Do. |

EXAMPLE II

Those polybasic acid anhydrides which can be employed in the process must upon hydrolysis in the solvent provide two or more carboxyl groups. The use of pyromellitic dianhydride in a solvent such as ethanol or methanol is possible because the alcohol causes the anhydride ring to be broken, thus forming two carboxyl groups with methyl or ethyl ester groups adjacent thereto.

Ten mil films of plastisol A prepared in Example I were cast on steel panels. One of the films was sprayed with a solution of 10% pyromellitic dianhydride in a mixture of 90% ethanol and 10% methanol. The other of the films was sprayed with a solution of 10% pyromellitic dianhydride in tetrahydro furan. The coated panels were baked for 5 minutes at 200° C. which is a normal wrinkling temperature. The panel sprayed with the alcohol solution of pyromellitic dianhydride exhibited an attractive wrinkle finish while the panel sprayed with pyromellitic dianhydride in tetrahydro furan did not show any surface wrinkling.

EXAMPLE III

The following plastisols containing varying levels of the epoxidized linseed oil of Example I were cast in a film on a steel panel and films were sprayed with solutions containing 2-10% of the curing agents indicated, followed by baking for 2 to 5 minutes at 210° C. to produce wrinkle finishes.

Plastisol F:
    55 parts polyvinyl chloride resin, dispersion type (Geon 121)
    45 parts polyvinyl chloride resin (Geon 202) (copolymer of vinyl chloride and vinylidene chloride)
    30 parts epoxidized linseed oil
    30 parts dioctyl phthalate
    20 parts titanium dioxide pigment

*Table II*

| Plastisol | Curing agent | Solvent | Finish obtained |
|---|---|---|---|
| F | Boron trifluoride | Methanol | Wrinkle. |
| F | Pyromellitic dianhydride | 90% ethyl alcohol, 10% methyl alcohol | Do. |
| C | Boron trifluoride | Methanol | Do. |
| C | Pyromellitic dianhydride | 90% ethyl alcohol, 10% methyl alcohol | Do. |

EXAMPLE IV

The following pastisols containing various epoxidized fatty materials were cast in the form of films on steel panels and sprayed with a solution of the curing agent, followed by baking at 205° C. for 2 to 5 minutes to develop a wrinkle.

Plastisol G:
    100 parts polyvinyl chloride resin, dispersion type (Geon 121)
    100 parts epoxidized soybean oil Plastisol H:
    100 parts polyvinyl chloride resin, dispersion type (Geon 121)
    50 parts epoxidized olive oil
    50 parts dioctyl phthalate Plastisol J:
    100 parts polyvinyl chloride resin, dispersion type (Geon 121)
    70 parts interesterified mixture of 60% epoxidized linseed oil and 40% butyl benzyl phthalate Plastisol K:
    100 parts polyvinyl chloride resin, dispersion type (Geon 121)
    50 parts butyl esters of epoxidized linseed oil fatty acids Plastisol L:
    100 parts polyvinyl chloride resin, dispersion type (Geon 121)
    50 parts epoxidized tallow
    30 parts dioctyl phthalate The epoxy-containing fatty materials analyzed as follows:

| | Free fatty acid (as percent oleic) | Saponification number | Iodine value | Percent epoxy oxygen |
|---|---|---|---|---|
| Epoxidized linseed oil | .07 | 173.8 | 5.87 | 9.3 |
| Epoxidized soybean oil | .04 | 179.0 | 3.21 | 6.9 |
| Epoxidized olive oil | | | 2.8 | 4.3 |
| Epoxidized tallow | | | | 1.9 |
| Butyl esters of epoxidized linseed oil fatty acids | | | | 7.9 |
| Ester of epoxidized linseed oil fatty acids and butyl benzyl phthalate | | | | 5.4 |

*Table III*

| Plastisol | Curing agent | Solvent | Finished obtained |
|---|---|---|---|
| C | Pyromellitic dianhydride | 90% ethyl alcohol, 10% methyl alcohol | Wrinkle |
| G | do | do | Do. |
| H | Boron trifluoride | Methanol | Do. |
| J | do | do | Do. |
| K | do | do | Do. |
| L | do | do | No wrinkle. |

It will be noted that in the case of epoxidized tallow there is insufficient oxirane oxygen to obtain cross-linking such as is required for the production of a wrinkle.

EXAMPLE V

The following solution was sprayed on a steel panel to provide a 4 mil dry thickness film:

100 parts resin [1]
20 parts epoxidized linseed oil
75 parts titanium dioxide pigment

[1] Vinylite VMCH (86% vinyl chloride, 13% vinyl acetate, 1% maleic acid).

The above composition was first diluted with a mixture of equal parts of methyl isobutyl ketone and xylene in order to obtain a sprayable mix. After desolventizing the coating, the film was sprayed with a solution of 20% pyromellitic dianhydride in the alcohol solvent mix (90% ethanol, 10% methanol) noted above. After spraying, the film and steel panel were baked for 1 to 2 minutes at 210° C. in an oven. An attractive white wrinkle finish was obtained on the surface of the coating.

A solution coating was also made up of 100 parts of a solution-type vinyl resin, 100 parts of epoxidized linseed oil, and 3 parts carbon black, diluted with 400 parts of a mixture of equal parts of methyl isobutyl ketone and xylene, which was deposited on a steel panel in a 4 mil thick film. The coating was desolventized for 1 hour at 165° F., after which the coating was cooled and a 20% solution of pyromellitic dianhydride in the alcohol mix was applied to the surface of the coating with a paint brush. The coated panel was then baked for 5 minutes at about 205° C with the result being a finely wrinkled finish on the surface of the coating.

EXAMPLE VI

In order to demonstrate the production of a film with a nonfatty polyepoxide of the bisphenol-epichlorohydrin type, a plastisol was prepared as follows:

100 parts polyvinyl chloride resin, dispersion type (Geon 121)
75 parts Epon resin [1]
35 parts dioctyl phthalate
2 parts yellow pigment

[1] Combination of (4,4'-isopropylidene diphenol) with epichlorohydrin in alkaline medium.

Three different steel panels were coated with 10 mil films of the above plastisol. Each of the coated panels was sprayed with different curing agents and each baked for 5 minutes at 210° C. with the result being an attractive wrinkle finish in each case. In one case the curing agent was boron trifluoride in methanol; in another boric acid in methanol; while in the third case the curing agent was pyromellitic dianhydride in the alcohol mix (90% ethanol, 10% methanol).

EXAMPLE VII

To show the production of the wrinkle with diepoxides the following plastisol was prepared:

100 parts polyvinyl chloride resin, dispersion type (Geon 121)
40 parts (3,4 epoxy-6-methylcyclohexylmethyl-3,4-epoxy-6-methylcyclohexanecarboxylate)
45 parts dioctyl phthalate The plastisol was cast in a film on a steel panel and sprayed with a 10% solution of boron trifluoride etherate in methanol. The sprayed coated panel was baked for 5 minutes at 205° C. with the development of an attractive clear wrinkle finish on the surface of the coating.

EXAMPLE VIII

Two milled 10 mil films containing polyepoxy fatty materials were sprayed with a solution of 20% pyromellitic dianhydride in the alcohol mix (90% ethanol, 10% methanol) and baked for 5 minutes at 210° C. The films were supported by a steel panel during these operations. Films prepared from mixes containing 50 parts epoxidized linseed oil (of Example I) and 50 parts epoxidized soybean oil for 100 parts of Geon 103 EP, which is a polyvinyl chloride resin containing 96+% vinyl halide units, were milled. In each case a wrinkle finish was obtained.

EXAMPLE IX

In order to show the use of a curing agent both in the nonwrinkled portion of the film and in the wrinkled portion of the film and to demonstrate that the wrinkle effect appears to be attributable to the difference in rate of cure between the surface and the remainder of the film, a plastisol containing a curing agent was prepared and cast on a steel panel followed by spraying with the solution of a curing agent and subsequent cure. The plastisol is as follows:

100 parts polyvinyl chloride resin, dispersion type (Geon 121)
100 parts epoxidized linseed oil (same as in Example I)
15 parts isophthalic acid
3 parts carbon black After casting a 10 mil film, the film was sprayed with a solution of pyromellitic dianhydride in the alcohol mix and another 10 mil film of the plastisol was sprayed with a solution of isophthalic acid in tetrahydrofuran. The coated panels were baked for 5 minutes at 210° C. and a wrinkle finish was produced in each case. Prolonged heating of the panels for 15 minutes at 210° C. resulted in a harder heat-cured wrinkle-finish film.

From the foregoing it can be appreciated that the film can be prepared by casting or milling or by plastisol techniques and sprayed with a curing agent or in the case of boron trifluoride with a curing gas. It is also possible to wrinkle one or both sides of the film while the film is supported or unsupported. For example, it is possible to form the film on a supporting surface followed by removal of the film from the supporting surface and formation of the wrinkle while the film is either supported or unsupported.

The ideal time and temperature of cure for a given polyepoxide-vinyl resin mixture are best determined by trial and error. The tensile strength of the coating depends upon the degree of cure, and tensile strength for a given coating cured at a specific temperature, say around 210° C., rises with exposure time and reaches a maximum just prior to degradation of the vinyl resin. Usually temperatures within the range of fusion of the vinyl resin (around 165° C.) and about 220° C. are satisfactory. Lower curing temperatures may be employed with substantially longer curing times and higher curing temperatures with very short treatment time can also be used.

As used in this specification and claims, the terms "cure" and "curing" have the meaning well known in the art. Cure signifies the change in physical properties of the polymer by curing agents and heat where necessary such that the composition undergoing cure becomes crosslinked and changes from a soluble fusible form to an infusible form of much decreased solubility.

Obviously many modifications and variations of the invention as hereinbefore set forth may be made without departing from the spirit and scope thereof, and therefore only those limitations are to be imposed as are indicated in the appended claims.

We claim:
1. An article comprising a structure having thereon a coating comprising a mixture of a vinyl resin and a polyepoxide, the surface of said coating having furrows and ridges characteristic of wrinkle coatings.
2. An article comprising a structure having thereon a coating comprising a mixture of a vinyl halide resin, said resin containing at least 50% vinyl halide units, and a polyepoxide, the surface of said coating contiguous to said structure being a smooth, continuous film and the surface of said coating away from said supporting structure having furrows and ridges characteristic of wrinkle coatings.
3. A modified vinyl film having a wrinkle finish comprising a thin coherent film of a resin mixture, said resin mixture comprising a homogeneous resin having at least 50% vinyl halide units and a polyepoxide, the surface of said film being puckered and shrunk into furrows and ridges characteristic of wrinkle finishes.
4. A process for preparing wrinkle-finish coatings and films of vinyl halide polymers comprising applying a homogeneous mixture of a vinyl halide resin and a polyepoxide as a continuous film on the surface of a supporting object, heating said object and said film to fuse said film, applying an epoxy curing agent to the surface of said film, and subjecting said film to curing conditions whereby to cause the surface of said film to shrink and pucker.
5. A process for coating an object with a tough, flexible wrinkle-finish vinyl film comprising depositing a homogeneous mixture of a vinyl halide resin containing at least 50% vinyl halide units and a polyepoxide as a continuous film on the surface of a supporting object, applying an epoxy curing agent to the surface of said film, and subjecting said film to curing conditions whereby to cause the surface of said film to shrink and pucker.
6. The method of claim 5 wherein the epoxy curing agent is applied in the form of said curing agent in a liquid carrier.
7. A process for preparing wrinkle-finish coatings and films of vinyl halide polymers comprising depositing a homogeneous mixture of a vinyl halide resin and an epoxidized fatty material containing more than one oxirane group in the fatty acyl radicals thereof as a continuous film on the surface of a supporting object, applying an epoxy curing agent on the surface of said film, and subjecting said film to curing conditions whereby to cause the surface of said film to shrink and pucker.
8. A method for coating an object with an adherent wrinkle-finish coating of a modified vinyl halide polymer comprising depositing a mixture of a vinyl halide polymer containing at least 50% vinyl chloride units and an oxirane-containing fatty material wherein the oxirane content of said fatty material exceeds about 8.5% on the surface of said object, spreading said mixture in the form of a film on said surface, applying an epoxy curing agent to the surface of said film, and subjecting said film to curing conditions whereby to cause said film to develop a wrinkle finish.

9. A process for preparing a wrinkle-finish coating on an object comprising applying a plastisol of a vinyl halide polymer and a polyepoxide, said vinyl halide polymer containing at least 50% vinyl chloride units, said polyepoxide containing more than one oxirane group per molecule on the surface of a supporting object, spreading said plastisol to form a continuous film on the surface of said object, treating said continuous film with an epoxy curing agent whereby to distribute on the surface of said film but not through said film to said supporting object an epoxy curing agent, and subjecting said film to curing conditions before said epoxy curing agent becomes distributed through the depth of said film to said supporting object.

10. A method for preparing a wrinkle-finish film comprising depositing a mixture of a vinyl halide resin and a polyepoxide on a supporting surface, spreading said mixture to form a continuous film on said surface, applying to said surface an epoxy curing agent comprising a polybasic carboxylic acid having a primary dissociation constant pKa less than 4.0, distributing said curing agent substantially over the surface of said film, and subjecting said film to curing conditions whereby to develop a wrinkle finish on the surface thereof.

11. The method of claim 10 wherein the epoxy curing agent is a polybasic aromatic acid.

12. A method for preparing a wrinkle-finish film from a modified vinyl halide polymer comprising applying a mixture of a vinyl chloride polymer and a polyepoxide to the surface of a supporting object in the form of a coherent, continuous film, depositing on the surface of said film an epoxy curing agent comprising a strong Lewis acid catalyst, distributing said curing agent over the surface of said film, and subjecting said film to curing conditions whereby to develop a wrinkle finish on the surface of said film.

13. A method of preparing a wrinkle finish comprising applying a curing agent on at least one surface of a curable thermoplastic film and subjecting said film to curing conditions whereby to develop a wrinkle finish on the surface thereof.

14. A method of preparing a wrinkle finish comprising depositing a polymerizable coating composition on the surface of an object, spreading said coating composition to develop a continuous film, applying a curing agent on the surface of said film, and subjecting said film to curing conditions whereby to develop a wrinkle finish on the surface thereof.

15. A decorative and protective film composition adapted for application to an object comprising a thin continuous film of a mixture of a vinyl halide resin and a polyepoxide, one of the surfaces of said film having a smooth finish, the other of the surfaces of said film having a wrinkle finish.

16. A method for preparing a wrinkle-finish film comprising forming a film of a mixture of a thermoplastic resin and a polyepoxide, applying a curing agent to at least one surface of said film and subjecting said film to curing conditions whereby to cure the mass of said thermoplastic resin polyepoxide composition at a rate slower than the rate of cure of said surface containing said curing agent.

17. A method for preparing a wrinkle-finish film comprising forming a film of a thermoplastic resin-polyepoxide mix, depositing on at least one surface of said film an epoxy cross-linking agent, and subjecting said film to curing conditions whereby to transform said film from a thermoplastic to thermoset state and develop a more rapid rate of cure in said film at the surface containing said curing agent whereby to cause said surface to cure faster than the remainder of said film and thereby develop a wrinkle finish.

18. A film adapted for use in the coating of objects with a wrinkle coating finish comprising a thin film of a vinyl resin-epoxidized fatty acid ester mix said film having distributed over at least one surface thereof an epoxy curing agent.

References Cited in the file of this patent

UNITED STATES PATENTS

| | | |
|---|---|---|
| 2,460,485 | Beynon | Feb. 1, 1949 |
| 2,564,194 | Nie | Aug. 14, 1951 |
| 2,707,177 | Skiff et al. | Apr. 26, 1955 |
| 2,744,832 | Drummond | May 8, 1956 |
| 2,849,332 | Smith et al. | Aug. 26, 1958 |